United States Patent
Milluzzi et al.

(10) Patent No.: US 12,131,652 B2
(45) Date of Patent: Oct. 29, 2024

(54) OUTDOOR LASER SHOW CONTROL SYSTEM USING AIRCRAFT TRACKING DATA

(71) Applicant: DISNEY ENTERPRISES, INC., Burbank, CA (US)

(72) Inventors: Andrew Jesse Milluzzi, Clermont, FL (US); Douglas Dixon, Ocoee, FL (US); Lori D. LaFrance, Orlando, FL (US); Amber Lynn Girard, Kissimmee, FL (US)

(73) Assignee: Disney Enterprises, Inc., Burbank, CA (US)

( * ) Notice: Subject to any disclaimer, the term of this patent is extended or adjusted under 35 U.S.C. 154(b) by 312 days.

(21) Appl. No.: 17/848,968

(22) Filed: Jun. 24, 2022

(65) Prior Publication Data
US 2023/0419841 A1 Dec. 28, 2023

(51) Int. Cl.
*G08G 5/00* (2006.01)
*G01C 15/00* (2006.01)

(52) U.S. Cl.
CPC ......... *G08G 5/0026* (2013.01); *G01C 15/004* (2013.01)

(58) Field of Classification Search
CPC ... G08G 5/0026; G08G 5/0021; G01C 15/004
See application file for complete search history.

(56) References Cited

U.S. PATENT DOCUMENTS

| 3,471,234 | A | * | 10/1969 | Studebaker | G01C 15/004 356/138 |
| 5,953,108 | A | * | 9/1999 | Falb | G01C 15/004 372/33 |
| 9,423,278 | B1 | * | 8/2016 | Kaufman | G01B 11/14 |
| 2003/0159299 | A1 | * | 8/2003 | Goodrich | G01C 15/004 33/286 |
| 2005/0082262 | A1 | * | 4/2005 | Rueb | G01S 5/16 219/121.6 |
| 2005/0121422 | A1 | * | 6/2005 | Morden | B25H 7/00 700/95 |
| 2005/0183273 | A1 | * | 8/2005 | Amron | G01C 15/004 33/289 |

(Continued)

FOREIGN PATENT DOCUMENTS

CN 113890609 A * 1/2022

*Primary Examiner* — Donald J Wallace
*Assistant Examiner* — Jalal C Coduroglu
(74) *Attorney, Agent, or Firm* — Onyx IP Group

(57) ABSTRACT

A control system, and associated control method, that processes aircraft tracking data to determine precise location information for aircraft in the vicinity of an outdoor show that includes laser projectors. The aircraft location information for each aircraft is processed along with heading and speed data to generate a set of laser control data, which is communicated via a monitoring interface to a laser projector operator for use in operating the laser projector. The control system determines the scan field into which the laser projector may project its light during the show, and this scan field is provided, e.g., visually in the monitoring interface, to the laser projector operator along with the sets of laser control data for each aircraft. The laser projector operator may then terminate or continue to operate the laser projector based on this very precise information related to the scan field and location of aircraft.

22 Claims, 5 Drawing Sheets

(56) References Cited

U.S. PATENT DOCUMENTS

| | | | |
|---|---|---|---|
| 2006/0059699 A1* | 3/2006 | Krantz | G01C 9/06 |
| | | | 33/286 |
| 2009/0229339 A1* | 9/2009 | Ashford | G01B 11/2504 |
| | | | 73/1.79 |
| 2014/0210996 A1* | 7/2014 | Rueb | G06T 7/292 |
| | | | 348/95 |
| 2018/0247421 A1* | 8/2018 | DeAngelis | H04N 23/695 |
| 2020/0408518 A1* | 12/2020 | Turalba | G01C 11/025 |
| 2022/0140562 A1* | 5/2022 | Zhang | G02B 27/18 |
| | | | 372/109 |

* cited by examiner

OUTDOOR LASER SHOW CONTROL SYSTEM USING AIRCRAFT TRACKING DATA

BACKGROUND

1. Field of the Description

The present invention relates, in general, to control systems and methods for safely providing an outdoor show that includes lasers, and, more particularly, to a laser show control system that is configured to facilitates terminating laser operations in an effective and safe manner when aircraft are traveling in or near a laser scan space or field.

2. Relevant Background

Outdoor laser shows are used in many settings to provide unique entertainment. For example, lasers are used as part of nighttime shows in theme and amusement parks to entertain crowds in outdoor venues. The laser lighting may be used to illuminate the sky above the crowd's heads on their own or as part of a show with an aerial display that may include fireworks, drones, projected features, and the like.

The laser projectors must be operated safely as part of these shows including when aircraft such as piloted airplanes and helicopters enter the air space in which the outdoor show is being presented. Many laser show or projector operators utilize unterminated lasers or laser projectors, and these laser projectors need to be operated so as to not interfere with aircraft. Particularly, operators of the laser projectors need to terminate laser emissions when there is a risk that laser light could be projected onto an aircraft or into a cockpit, which could undesirably interfere with a pilot's vision.

During operations of a laser projector or show system with lasers in an outdoor setting, it is presently assumed that if an airplane is visible or can be seen by a human then it can be hit by light output by a laser projector. To avoid any possible issues with aircraft, a human spotter is employed to watch the skies where a show is provided and to communicate via radio with the laser operator. If an aircraft is seen, the spotter communicates this to the laser operator who manually terminates the laser. The human spotter must determine if a light is an aircraft and if the aircraft is in or closely approaching the scan field of the laser system.

There are a number of issues with the existing method of controlling lasers in outdoor shows. First, it is possible for a human spotter to miss an aircraft that is flying into a scan field such as when its not properly lit or due to clouds or other obstructions to sight. Second, the present method is very conservative as laser operators typically terminate lasers if any plane is even suspected of being in the scan area, which can result in significant termination of lasers during shows depending upon the location of the outdoor show relative to aircraft traffic patterns. Hence, there remains a need for new approaches to controlling laser projectors for outdoor shows including more accurate and timely termination of lasers when aircraft are present in a scan field.

SUMMARY

To address the above and other issues, a control system, and associated control method, is provided that processes aircraft tracking data to determine precise location information for all aircraft in the vicinity of an outdoor show that includes one or more laser projectors. The aircraft location information for each detected aircraft is processed along with heading and speed data to generate a set of laser control data, which is communicated to a laser projector operator for use in operating the laser projector including terminating operations. The control system also determines the three-dimensional (3D) space or "scan field" (e.g., a digital model of the scan field, which may be pie shaped) into which the laser projector may project its light during the show, and this scan field is provided, e.g., visually in a graphical user interface (GUI) on a monitoring device, to the laser projector operator along with the sets of laser control data for each aircraft. The laser projector operator may then terminate or continue to operate the laser projector based on this very precise information related to the scan field and location (and heading and speed) of aircraft, and the control system may in some cases be configured with features to automate the termination decision (e.g., terminate laser projection when an aircraft has or is about to enter the scan field and an operator has not yet provided user input indicating awareness of the aircraft).

More particularly, a system is provided for use in controlling a laser projector during its use within an outdoor show that includes laser lighting. The system includes a receiver configured for receiving a tracking beacon transmitted by a transmitter in an aircraft. The system also includes a monitoring system communicatively linked to the receiver operable to communicate with the receiver to receive aircraft tracking data provided in the tracking beacon. Memory or data storage is provided that is accessible by the monitoring system and that stores a digital model of a scan field for the laser projector. The system further includes a display in the monitoring system with a screen observable by an operator. A processor is included in the monitoring system that is configured to execute code or instructions to provide a control module. During system operations, the control module generates a monitoring interface displayed on the screen, and the monitoring interface includes an image of the digital model of the scan field and an icon representing the aircraft. Significantly, the icon is spatially mapped to boundaries of the digital model of the scan field.

In some preferred embodiments, the transmitter is configured according to the ADS-B protocol and the tracking beacon complies with the ADS-B protocol to include a current position, altitude, heading, and speed for the aircraft. The aircraft tracking data, hence, may include a current position and altitude for the aircraft, and the control module may be configured to determine 3D coordinates for the aircraft based on the current position and altitude and to spatially map the icon relative to the image of the digital model of the scan field using the 3D coordinates. Further, the aircraft tracking data may include a heading of the aircraft, and the control module may be configured to graphically or textually represent the heading of the aircraft proximate to or linked to the icon representing the aircraft in the monitoring interface.

In some embodiments of the system, the control module is configured to process the aircraft tracking data to determine a warning classification for the aircraft by comparing a position of the aircraft provided in the tracking beacon with the boundaries of the digital model of the scan field. Then, the monitoring interface may be generated to include the warning classification (e.g., terminate laser (with red color coding), potential for termination of laser (with yellow color coding), and no intersection issue (with green color coding)). The warning classification can be determined in part based on a current heading of the aircraft provided in the tracking beacon indicating the aircraft will intersect with the scan field or is moving away from the scan field (e.g., for the yellow and green color-coded classifications in the above example). The control module can be configured to generate GPS coordinates for each of the boundaries of the scan field to define the digital model. and the GPS coordinates can be calculated (or provided as pre-defined values) based on the horizontal and vertical scan angles of the laser projector. Further, the GPS coordinates of an outer boundary can be calculated based on a range of the laser projector calculated by the control module or may be pre-defined (e.g., by system designers or the like) and provided in data storage accessible by the control module.

In some implementations of the system, the GPS coordinates of at least one of the boundaries are modified by the control module based on a laser projection profile associated with an outdoor show being performed in part by the laser projector during an operating period in which the tracking beacon is received by the receiver. In this or other cases, the control module automatically generates a termination signal that is communicated to the laser projector when the control module determines the aircraft is intersecting or will intersect within a predefined amount of time with the scan field based on a comparison of the digital model of the scan field and a current position or current position, heading, and speed provided in the aircraft tracking data.

DETAILED DESCRIPTION

Figure 1A:
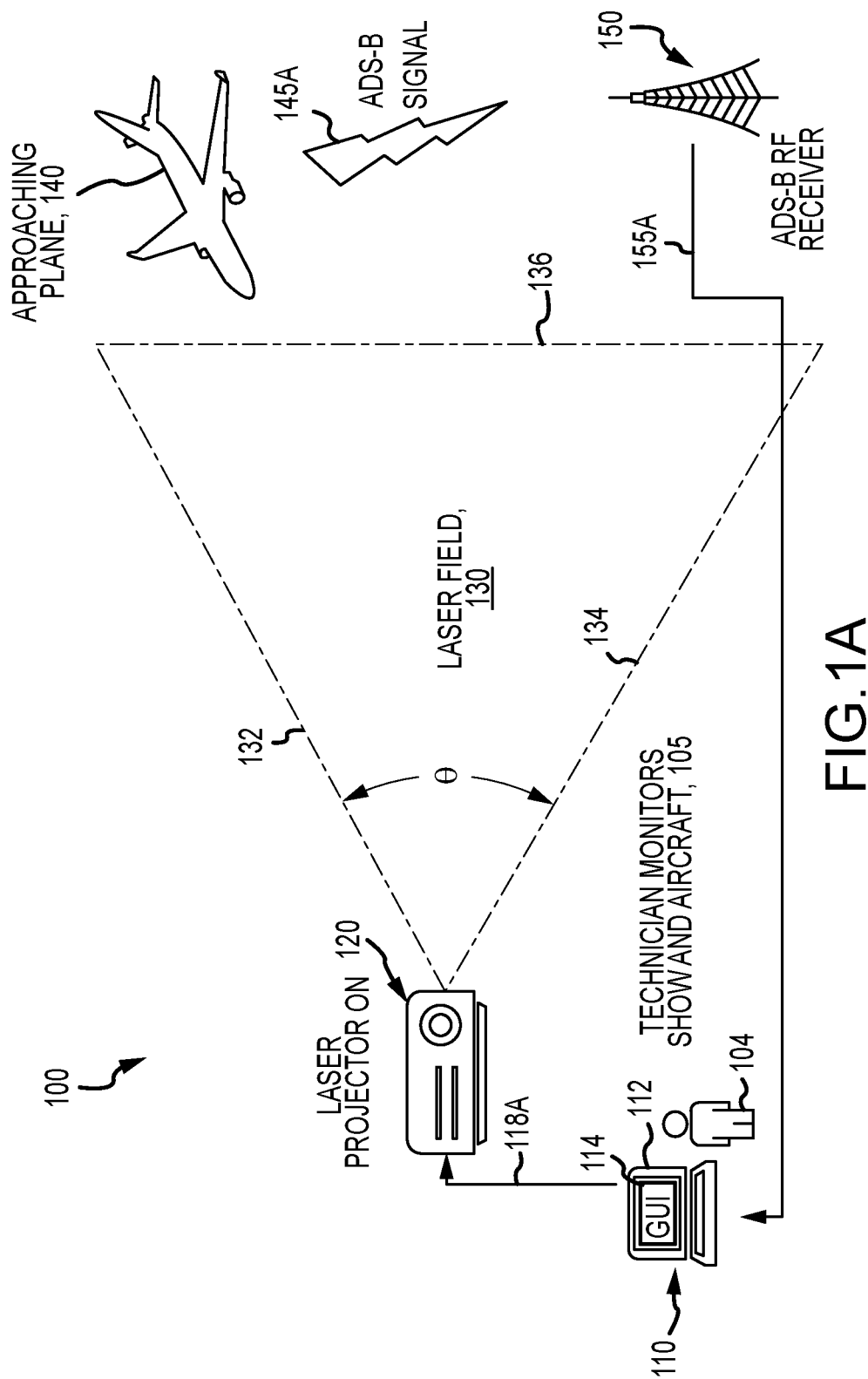
FIGS. 1A and 1B are schematic illustrations of an outdoor laser show system with a control system of the present description operating in two modes or states in response to a tracked aircraft.

Embodiments described herein are directed toward an outdoor show system with a control assembly or system that is configured to receive and process aircraft tracking data from aircraft to control when to safe or terminate a laser projector of the outdoor show system. In some embodiments, the control system includes a controller or control module running on an operator's monitoring system that generates a monitoring interface (e.g., a GUI) for display upon a screen of a display device of the monitoring system. This monitoring interface is created so as to include an image of the 3D scan field of a laser projector controlled by the human operator. Additionally, the monitoring interface is generated to overlay data pertaining to each airplane for which aircraft tracking data has been received. This overlay data (or set of control data) may include an icon of each aircraft with its current location relative to the image of the 3D scan field (and its boundaries), and the overlay data may also include, e.g., adjacent or near a corresponding aircraft icon, an aircraft's heading, speed, and other data (e.g., GPS coordinates, altitude, or the like) that may be useful for determining when to safe or terminate a laser projector.

Based on the information in the monitoring interface, the human operator may decide when it is appropriate to terminate a laser projector, and, in some cases, all or portions of the termination operations are automated and performed by the controller or control module.

The inventors recognized that aircraft are equipped with transmitters that transmit tracking beacons or signals, which can be used to determine a precise location of an aircraft as these signals provide aircraft tracking data. Specifically, ADS-B is a protocol that airplanes use to beacon their current position, heading, and altitude, and, as of 2020, all aircraft are required to include an ADS-B transmitter to provide radio frequency (RF) signals or beacons complying with the ADS-B protocol. With this fact in mind, the inventors designed a control system for outdoor show systems (which include one or more laser projectors) that includes a receiver configured for receiving the ADS-B beacons or signals (or an ADS-B receiver). This receiver may be located on a tall object on property in or near the show space so as to receive signals from aircraft in a large tracing area (e.g., up to 100 mile radius circle or the like) and function to provide the beacons/signals it receives (or the aircraft tracking data in such signals) to the controller or control module for processing and use by an operator in making the safe or termination decision. By combing the laser scan field (and space nearby its outer boundaries in many applications) for live ADS-B signals and providing aircraft control data to the operator, the control system can be used by the human operator to determine if and when a laser should be terminated or disconnected with much greater certainty and with fewer unnecessary terminations than existing manual spotter-based systems.

In brief, the control system works by first generating a digital model of the scan field of the laser projector, with its side and upper boundaries defined as well as its outer boundary (defined, at least in part, by a calculated range of the laser projector) and second finding any possible intersection of one or more aircraft based on the aircraft tracking data from their transmitted tracking beacon/signal. The laser scan field is formed by capturing GPS coordinates of the potential scan area that is not blocked by a physical aperture (e.g., a maximum angular projection may be considered one of the projector's specifications or operating parameters that may be known or can be set prior to operations). The GPS coordinates can be coupled with the maximum vertical scan angle visible through the aperture (another laser projector specification or operating parameter that is known or can be set) to create a 3D volume or model of the laser scan field, and the controller software is configured to monitor this 3D volume or model for intrusions by aircraft.

The coordinates and heading of aircraft, for which a tracking beacon are received by the system's tracking beacon receiver, are provided via the tracking beacons/signals (which typically are configured according to the ADS-B or other aircraft tracking/communications protocol), and the controller or control module uses this information to provide a set of control data to the operator via their monitoring system/device. For example, a monitoring interface or GUI is provided on a screen of display device that includes an image of the 3D model of the scan field along with aircraft icons, which are placed spatially relative to the 3D model using the received position and altitude (to provide a 3D coordinate). Additionally, the heading and speed (e.g., airspeed) may be displayed via text or with symbols/imagery in the monitoring interface.

The human operator can then compare the aircraft with the 3D model of the scan field. This may be assisted by the controller generating the monitoring interface to include visual markings of each aircraft (or its icon or symbol) in a color-coded manner, e.g., red to indicate the laser should be terminated as the aircraft is or will soon be in the scan field, yellow to indicate the laser may require termination based on its location outside the scan field and heading into the scan field, and green to indicate the aircraft does not appear to impact the termination decision as its location and heading do not indicate a likely intrusion into the scan field. During typical operations, the controller (e.g., the software it is executing to provide control functions and to generate the monitoring interface) classifies each aircraft associated with a received tracking beacon based on its position and heading. The controller may also consider, in its warning classification process, aircraft that are close or proximate to the outer boundaries of the scan field (e.g., within a predefined distance from a boundary or within a predefined travel time from intersecting with a boundary) based on the aircraft's position, heading, and current velocity (e.g., color this aircraft's icon/symbol yellow and provide a timing of a likely intrusion).

The control system is designed and operates to provide more data (e.g., the set of control data per aircraft in conjunction with the display of the 3D model of the scan field) to the show technicians/operators. Further, the system can be configured to provide auto-disconnects of the laser system. For example, an operator/technician may be required to provide user input via the monitoring interface (or via another input device) confirming they are aware of and are monitoring an aircraft that the controller/control module has identified as requiring termination or of potentially requiring termination (e.g., color-coded red or yellow in the above examples). When confirmation is not received, the controller may be configured to automatically disconnect or inhibit the laser output (e.g., immediately for "red" aircraft and when intersection is anticipated for "yellow" aircraft).

In addition to improving safety, the control system can also improve show quality by allowing the operator to avoid unnecessary terminations such as when an aircraft is traveling away from the scan field based on heading information, when an aircraft is visible but outside the scan field such as too high or too low, when an aircraft is visible to a spotter but outside the safety range of the laser projector (so outside the outer boundary of the 3D model of the scan field), and so on. The control system is flexible enough that scan field proximity data can be provided as either an automatic disconnect trigger or as additional data to the laser operator. A single implementation of the control system (and its control software) can be partitioned to run multiple shows in different locations and/or to handle multiple laser scan fields. Further, the control system may include a bypass function if there is a monitoring failure (e.g., loss of communications between a beacon receiver and the operator's monitoring system/device running the controller/control module). In some control system embodiments, two or more beacon receivers (e.g., ADS-B receivers) may be used to provide fault tolerance or provide additional data to the control system. The control system may utilize a variety of communication technologies such as communicating using EtherCAT Automation Protocol and existing (or implemented) Beckhoff entertainment control systems or the like.

Figure 1B:
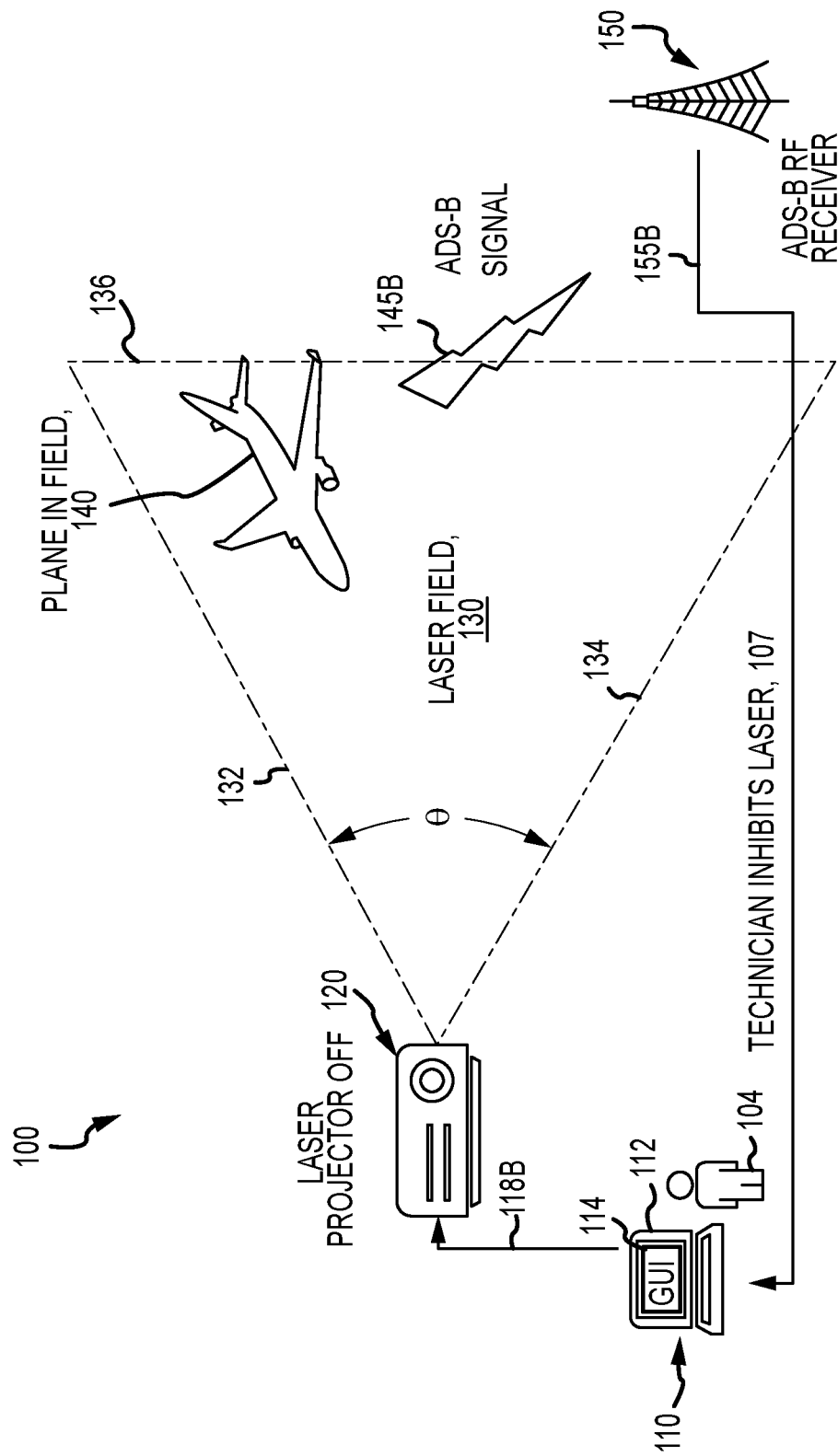

FIGS. 1A and 1B are schematic illustrations of an outdoor laser show system 100 with a control system of the present description operating in two modes or states (one with laser projector operating and one with laser projector disconnected or terminated) in response to a tracked aircraft 140. As shown, a human operator or technician 104 is operating or controlling a laser projector 120 via a monitoring device or system 110, which may take the form of nearly any computing device with a processor configured to execute code or software to perform the monitoring and control functions described herein. As shown, the monitoring system 110 includes a display device with a screen operating to display a monitoring interface or GUI 114, which is configured to display a 3D model of the laser field 130 along with control data for the plane 140, and the technician is shown in FIG. 1A as noted at 105 to be monitoring a laser show and aircraft 140.

In this regard, the technician 104 uses the monitoring system 110 to generate control signals 118A to operate a laser projector 120 in an on or projecting state to provide laser light in a laser scan field 130. The laser 120 is "on" because a monitored aircraft 140 is determined to be outside the scan field 130. The laser projector 120 has a horizontal or lateral scan angle, θ, such as in the range of 45 to 75 degrees with many commercial projectors having a maximum horizontal scan angle, θ, of 60 degrees, and this sets the side boundaries 132 and 134 of the pie-shaped scan field 130. A vertical scan angle would set the upper boundary (not shown), which may be up to about 30 degrees. The outer boundary 136 of the laser scan field 136 is set based on the calculated maximum range of the projector 120, and it is typically calculated on a set of specifications or operating parameters for the projector 120 including power. In some embodiments, the range may be in the range of 8 to 12 miles. The controller software on the monitoring device 110 uses this information about the projector 120 to generate a digital model of the laser scan field 130 with GPS coordinates of the boundaries 132, 134, 136 (and a vertical boundary) being defined. The GUI 114 is typically generated so as to include an image or representation of the digital model of the scan field 130.

In FIG. 1A, a plane 140 is shown to be outside the laser scan field 130. In prior systems, the mere sight of the plane 140 may have caused the operator 104 to safe or disconnect the projector 120. In contrast, the system 100 includes a beacon receiver 150 configured to receive a beacon signal 145A, which may be an RF signal complying with the ADS-B protocol and include GPS coordinates, heading, altitude, and speed of the aircraft 140. When the beacon transmitter (not shown) on plane 140 is in range of the receiver 150 (i.e., within a radial distance such that the signal 145A can be received by receiver 150), the receiver 150 acts to pass the signal or the aircraft tracking data contained within the signal 155A to the monitoring system 110, as shown with arrow 155A (with the receiver 150 and system 110 being communicatively linked, typically in a wireless manner).

In response to receipt of the aircraft tracking data 155A, the controller/control module of the monitoring system 110 processes the data to generate a set of control data for the plane 140, and this control data or a portion thereof is used to update the GUI 114. In some embodiments, a symbol or icon representing the plane 140 is displayed in the GUI 114 in a position that is spatially mapped relative to the boundaries 132, 134, and 136 (and the vertical boundary) of the scan field 130 (e.g., in a spatial position relative to the boundaries of the digital model also displayed in the GUI 114). The symbol may be color coded, as discussed above in yellow for example, to indicate that the plane 140 is a potential concern and may in the future require termination of the laser projector 120. A portion of the control data for the plane 140, such as the heading, altitude, and/or speed, may also be provided in the GUI 114 such as with text or with graphics provided near the plane symbol or icon (or linked to such symbol or icon). The technician 104 can monitor the GUI 114 and readily observe from the visual display that the plane 140 is outside the scan field 130, and, in response, issue the control signals 118A to have the projector on or outputting laser light safely into the scan field 130.

FIG. 1A shows the system 100 at a later point in time. As shown, the plane 140 has not traveled into the scan field 140. The beacon signal 145B would provide tracking data including the plane position, which would be communicated by the receiver 150 to the monitoring system 110 as shown with arrow 155B. The monitoring system 110 would process this data and update the GUI 114 to show the plane symbol or icon now in the image of the digital model of the scan field 130. In response, the technician 104 would inhibit the laser 120 as shown at 107 such as by transmitting new control signals 118B to safe or terminate the projection or to turn the laser "off" (or place in in safe mode). The symbol or icon representing the plane 140 in the GUI 114 may be color coded (e.g., red or another useful color) to indicate that the technician should take this termination action 107. In some embodiments, the color coding would be changed when the movement of the plane 140 into the field 130 is within a predefined distance or time (e.g., entry in a time falling in a predefined warning window of 5 to 15 seconds or the like) to allow the technician to have time to react and transmit the termination or off control signal 118B.

Figure 2:
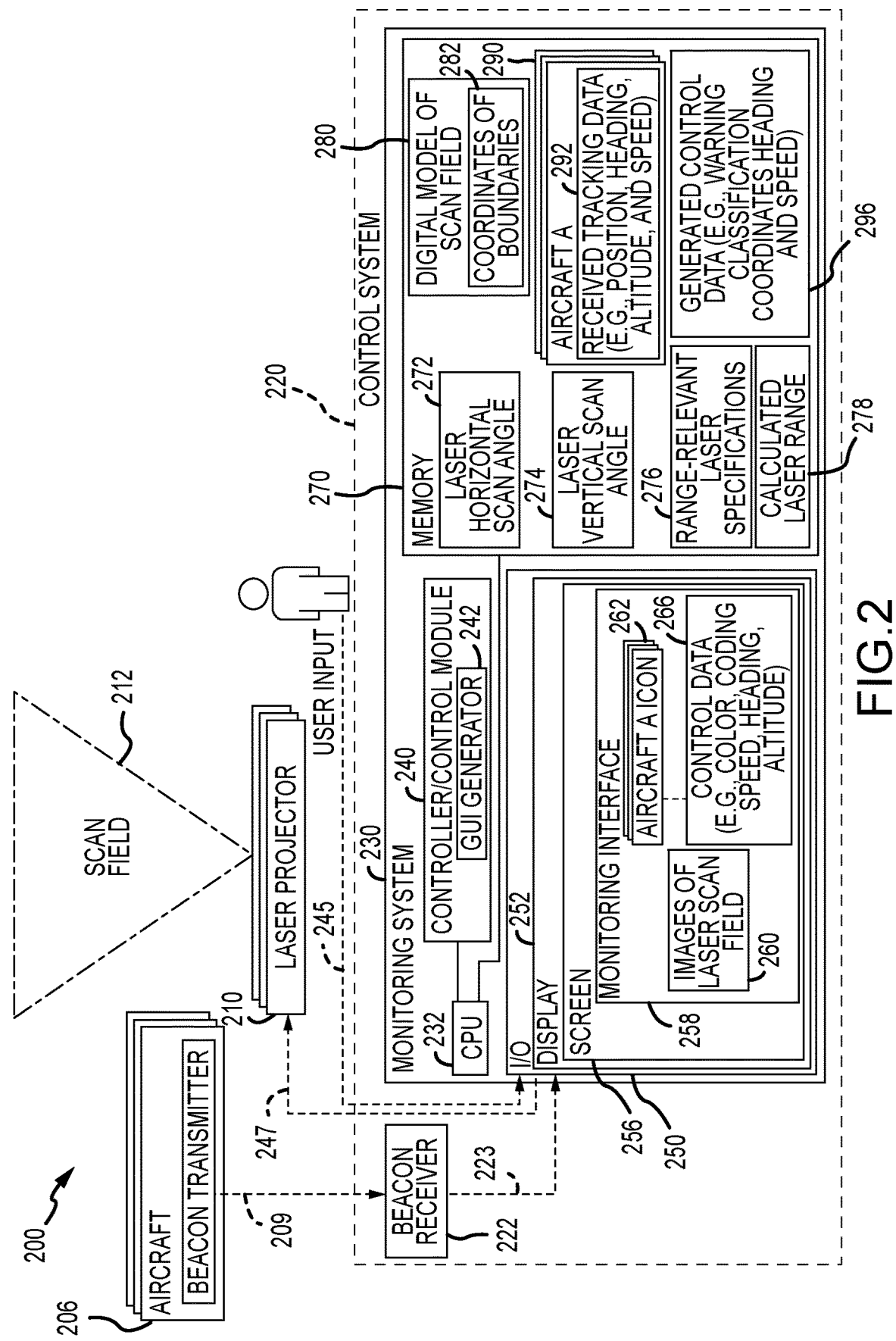
FIG. 2 is a functional block diagram of an outdoor laser show system that includes a control assembly or system facilitating control of a laser projector based on aircraft traffic.

FIG. 2 is a functional block diagram of an outdoor laser show system 200 that includes a control assembly or system 220 facilitating control of a laser projector 210 based on monitoring or nearby aircraft traffic. The show system 200 includes one or more laser projectors 210 each operable to project or output laser light into a 3D scan field 212, e.g., a space above a portion of a theme park, a concert venue, a cruise ship, or the like. One-to-many aircraft 206 may travel in the airspace near the scan field 212 and may intermittently fly through or have a travel path that intersects the scan field 212. The show system 200 is shown to include a control system 220 that is configured particularly to allow a human operator 204 to terminate the laser projector 210 to ensure the safety of the aircraft 206 and/or to provide automated termination of the laser projector 210 in some embodiments or in some operating modes.

Each aircraft 206 includes or is equipped with a beacon transmitter 208, which may comply with local air traffic control protocols such as the ADS-B protocol. Particularly, the transmitter 208 transmits (e.g., once a second or once every several seconds) a tracking beacon 209 that provides aircraft tracking data for the aircraft 206. This tracking data may include the current aircraft position, heading, altitude, speed, and the like. The control system 220 is shown to include at least one beacon receiver 222 (e.g., a receiver configured to receive RF ADS-B signals) that receives the beacon 209 and communicates this signal or data included therein to a monitoring system 230 in the control system 220 as shown by dashed line 223. Often, the system 220 will include two or more beacon receivers 222 to provide redundancy in receiving 209 and forwarding 223 the signals or signal data in a wired or wireless manner to the monitoring system 230.

The monitoring system 230 may take the form of nearly any useful computer system or computing device including a desktop computer, a laptop or notebook, a pad, a cellular phone, or the like. The monitoring system 230 is shown to include a processor(s) 232 that is configured to execute code, instructions, or software to provide the functionality of a controller or control module 240 as described herein. The processor 232 also manages operations and access to input/output (I/O) devices 250 as well as data storage/memory 220 (which may be in the system 230 or accessible by the controller 240 via the processor 232.

The I/O devices 250 include one or more components for receiving user input 245 from the human operator 204, and these may include a keyboard, a mouse, voice recognition software/firmware, a touchpad, a touchscreen, or other known or developed input devices. This allows the operator 204 to provide the input 245 to confirm that they are aware of a tracked aircraft 206 and to enter on/off or on/terminate (or disconnect) commands that are transmitted as shown by dashed line 247 to the laser projector 210. The I/O devices 250 include a display 252 with a screen 256, and the controller 250 includes a GUI generator 242 configured to generate a monitoring interface (or GUI) 258 that is displayed to the operator 204 on the screen 256. This allows the operator 204 to visually track locations and movements of an aircraft 206 in an airspace that includes the scan field 212.

The controller 240 is configured to receive the tracking data or beacon signal as shown at 223 and to create a record 290 for each aircraft 206 that includes the received tracking data 292. As noted above, the aircraft tracking data 292 may include the current position, altitude, heading, and speed of the aircraft 206. The controller 240 processes this data 292 to generate a set of control data 296 associated with each aircraft 206, and this may include current 3D coordinates of the aircraft, the current heading of the aircraft along with its speed, and a warning classification. The warning classification may involve determining whether the aircraft's 3D coordinates place the aircraft 206 in the scan field 212 (or within a predefined range outside the boundaries of the scan field 212 or time for intersection based on their coordinates, speed, and heading and boundaries of the scan field 212) leading to a terminate classification for the laser projector 210 (and may be color coded red in some cases). The classification may also be determined by the controller 240 to be an intermediate classification indicating that the current location of the aircraft 206 is outside the scan field 212 but that its heading may result in it intersecting with the field 212 in the future (and may be color coded yellow in some cases). In other cases, the classification determined by the controller 240 may be safe or no indication of possible intersection, such as when the 3D coordinates are outside the field 212 and the heading is in a direction away from the scan field 212 or in a direction that will not intersect with the boundaries of the scan field 212 (and may be color coded green in some cases).

The controller 214 is also configured to determine a digital model 280 of the scan field 212, which is defined by a set of GPS coordinates of the boundaries of the scan field 212. This digital model 280 may be used in the warning classification processing described above that is performed by the controller 240 comparing the received tracking data 292 to the digital model 280. The controller determines or generates the digital model 280 by processing specifications or operating parameters of the projector 210. These may be stored in memory 270 and may include the laser horizontal scan angle 272 (which may be about 60 degrees for many commercial laser projectors used for projector 210), the laser vertical scan angle 274 (which may be in the range of 15 to 30 degrees for some laser projectors 210), and a set of range-relevant laser specifications 276 (such as power of the projector 210). The controller 240 processes the range-relevant laser specification 276 to calculate a maximum range 278 of the projector 210, which is used to calculate the outer boundary 282 of the scan field 212 (and may be in the range of 10 to 12 miles for typical commercial lasers 210). The side boundaries 282 for the digital model 280 are calculated using the horizontal scan angle 272 while the upper boundary 282 for the digital model 280 are calculated using the vertical scan angle 274.

In some embodiments, the digital model 280 is modified such that the boundaries 282 are made larger to provide a safety buffer to allow the operator 204 to respond and/or to account for mechanical component delays (for a shutter on projector 210 to engage to safe a projector 210 or the like). In these cases, the boundaries identified by the above detailed process may be expanded outward such as by a predefined distance or a predefined percentage (e.g., multiply by 1.1 for a ten percent increase or buffer in field 212). In other embodiments, however, the digital model 280 may be generated to more closely track the particular show being provided by the system 200. For example, a scan profile may be defined for the projector that defines a subset of the overall volume defined by the boundaries 282 in which light from the projector 210 is planned to be projected, and this subset of the volume may be used to revise the coordinates of the boundaries 282 so as to shrink the size of the modeled scan field 280 and reduce the number of unnecessary terminations of the laser projector 210 due to aircraft 206.

With the digital model 280 created and stored in memory 270, the controller 240 uses a GUI generator 242 to create and display a monitoring interface 258 on the screen 256 of the display 252. The monitoring interface 258 includes an image of the laser scan field 260 that is generated based on the digital model 280 with its coordinates of the boundaries 282. The monitoring interface 258 is also generated to include a set of aircraft icons 262 for each aircraft 206 for which tracking beacons 209 are received by the receiver 222 (of for those with relevance, as determined by the controller 240, to the scan field 212). These are mapped in the interface 258 spatially to the image of the laser scan field 260 to provide the operator 204 with visual cues as to when they may need to terminate or disconnect the laser projector 210. Linked to or displayed proximate to the icons 262 is all or a portion of the control data 296 as shown at 266 in monitoring interface 258. For example, the icon 262 may be colored in a manner dictated by the warning classification in the control data 296. In this and other examples, current heading, speed, and/or altitude of the aircraft 206 associated with the icon 262 may be provided in text and/or with graphics.

With this displayed information in the monitoring interface 258, the operator 204 can respond by providing user input 245 to terminate or disconnect the laser projector 210 as well as to turn the laser projector 210 back "on" when a tracked aircraft 206 has exited the scan field 212 (or when a close call with regard to intersection has been confirmed as not being an intersection issue). In some implementations, the transmission of termination or off signals 247 may be automated. For example, the controller 240 may query the operator 204 to provide input 245 indicating that they are aware of an icon 262 (and an associated tracked aircraft 206) such as by selecting the icon 262 in interface 258, and, when this input is not received within a predefined time period, the controller 240 may generate a terminate or off signal 247 to disconnect the laser projector 210.

In other examples, the controller 240 may be configured to automatically generate the terminate or off signals 247 whenever an aircraft 206 is determined to be within the scan field 212 based on a comparison of the 3D coordinates of the aircraft 206 (as may be defined in the received tracking data 292) with the coordinates of the boundaries 282 of the digital model 280 of the scan field 212. The resume or on signal 247 may later be generated manually based on user input 245 from operator 204 or automatically by the controller 240 when the aircraft 206 is determined to have left the scan field 212.

Figure 3:
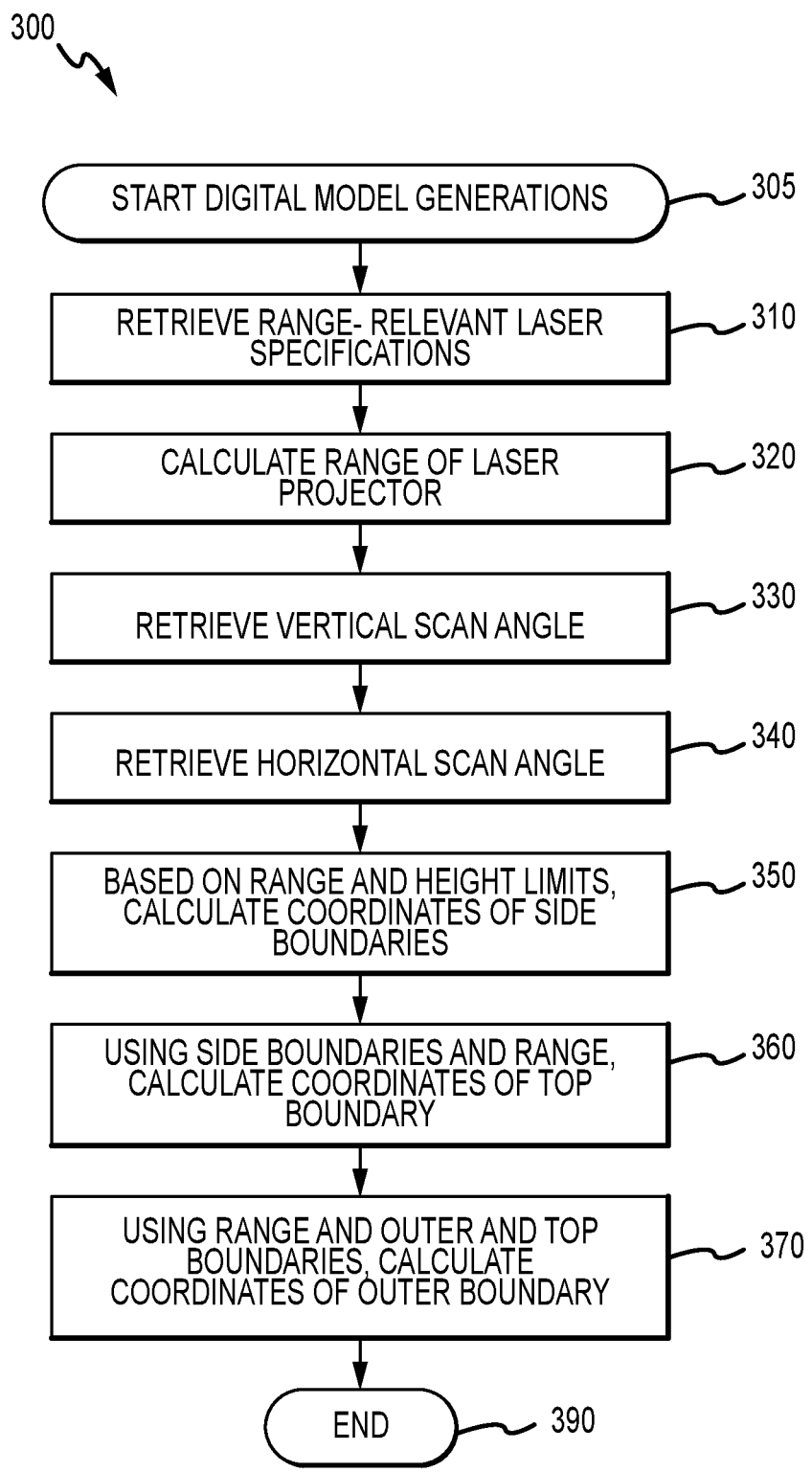
FIG. 3 is a flow diagram showing steps of an exemplary process for generating a digital model of a scan field for a laser projector.

FIG. 3 is a flow diagram showing steps of an exemplary process 300 for generating a digital model of a scan field for a laser projector that can be used in comparisons of tracked aircraft positions and in generating a monitoring interface. As shown, the method 300 starts at 305 such as with loading a controller upon a monitoring system and storing operating parameters and/or specifications for a laser projector in memory accessible by the controller. The method 300 continues at 310 with the controller retrieving range-relevant laser specifications from memory, and these may include the power, aperture characteristics, and other specifications. At step 320, the method 300 continues with the controller calculating a range of the laser projector (from the current position of the laser projector, which may be defined by GPS coordinates) beyond which its output light would not be of concern with regard to aircraft (e.g., a vertical plane may be set at 10 to 12 miles or the like from the current position of the projector).

Then, at 330 and 340, the method 300 continues with the controller retrieving from memory (or these and the values regarding range may be entered by an operator of a monitoring system) the vertical and horizontal scan angles (e.g., about 30 and 60 degrees, respectively, in some implementations). The orientation of the lens or output of the laser projector along with its GPS coordinates may also be retrieved or input at this point in the method 300. At 350, the controller acts to calculate the coordinates of the side boundaries of the projector's scan field based on the horizontal scan angle as well as the orientation of the projector lens, the range, and the maximum height as set by the vertical scan angle. Then, at 360, the method 300 continues with the controller calculating the top boundary of the scan field using the vertical scan angle, the range, and the side boundary coordinates. At 370, the controller then calculates the outer boundary of the scan field of the projector based on the range and the coordinates of the outer and top boundaries. The coordinates of the boundaries defines a digital model of the scan field, which is generally shaped like a pie wedge or slice.

Figure 4:
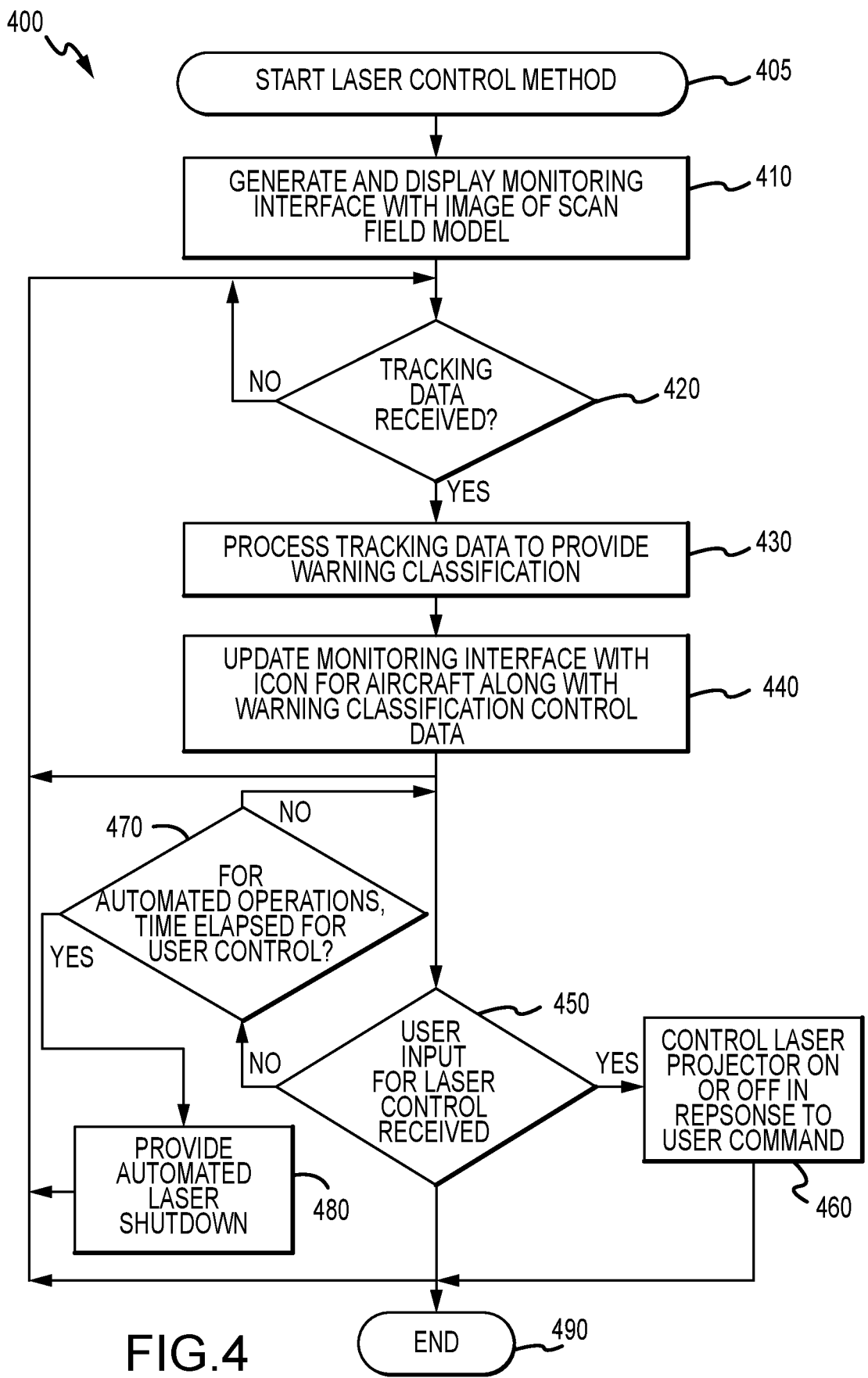
FIG. 4 is a flow diagram showing steps of a laser projector control method of the present description such as may be provided by operations of the systems of FIGS. 1A-2.

FIG. 4 is a flow diagram showing steps of a laser projector control method 400 of the present description such as may be provided by operations of the systems of FIGS. 1A-2. As shown, the method 400 begins at 405 such as with communicatively linking a beacon receiver (e.g., an ADS-B RF receiver), which is positioned proximate to an outdoor laser space, with a monitoring system. Step 405 may also include loading controller software upon the monitoring device, with this software being configured as discussed above with regard to controller 240 in FIG. 2.

The method 400 continues at 410 with the controller generating and displaying (via operations of a display in the monitoring system) a monitoring interface that includes an image of a digital model of the scan field of a laser projector being controlled by method 400. The digital model may be generated through the use of method 300 of FIG. 3 and provides a visual representation of the 3D volume in which the laser projector may output its light during a show provided by an outdoor laser show system. At step 420, the controller monitors for receipt of new tracking data for an aircraft from the beacon receiver.

When tracking data is received, the method 400 continues at 430 with the controller processing the aircraft tracking data, e.g., the current position, altitude, speed, and heading, to determine a warning classification for the tracked aircraft. As discussed above, the warning classification may separate tracked aircraft into three categories, which include: (a) a termination classification associated with an aircraft determined to be positioned within the scan field boundaries or about to intersect these boundaries (e.g., within the next 10 seconds (or another predefined time period) based on heading and speed from current 3D coordinates); (b) an intermediate or cautionary classification associated with an aircraft outside the scan field boundaries but with a position and heading that may result in an intersection with the scan field (or its boundaries); and (c) a neutral or lower classification associated with an aircraft located outside the scan field that has a position and heading that will not result in an intersection with the scan field.

The method 400 continues at 440 with the controller updating the monitoring interface with an icon for the aircraft (or an update of the location of the icon if already displayed) that is spatially mapped to the boundaries of the image of the scan field model in the interface. The warning classification determined at step 430 may also be used to update the interface such as by coloring the icon (red, yellow, or green as discussed above, for example). Control data such as heading and speed extracted from the beacon signal may also be used to update the interface such as with text or graphics proximate to the aircraft's icon. The method 400 may then continue at 420 with monitoring for additional tracking data from a next received tracking beacon from the same or another aircraft.

With the interface displayed to a human operator, the method 400 may continue at 450 with monitoring for user input to modify laser control based on a tracked aircraft. If received, the method 400 may continue at 460 with the controller generating and transmitting a control signal to turn the laser projector off or terminate/disconnect it, e.g., in response to user input in the user interface or otherwise. This may occur when the operator determines an aircraft is within the scan field or soon will be or to turn the laser projector back on or projecting when the operator determines an aircraft has moved out of the scan field or is not longer a possible intersection risk such that the laser portion of the outdoor show may safely continue.

As shown, the laser projector control may be fully or partially automated in some cases. In such cases, if at 450 no user input has been received (or at least an indication that the user is aware of a tracked plane), the method 400 may continue at 470 with a decision block or gate carried out by the control software to determine whether, based on operations of a timer initiated by completion of step 440, for instance, a predefined time period has elapsed in which a user is expected to enter a control signal (or at least an "aware" indication of the plane shown in the GUI). If the time has not elapsed as determined at 470, the method 400 continues at 450. If the time has elapsed as determined at 470, the method 400 may continue at 480 with the controller/control software acting to provide control signals to automatically terminate one or more laser projectors (or otherwise operate the laser projector(s) in a safe mode). The method 400, after step 450 (or steps 460 and 480) may continue at 420 or end at 490 (such as with the end of the outdoor laser show).

In both the manual and automatic control embodiments, the termination of a laser projector may be time based. Further, the method 400 (and systems implementing the method 400) is sometimes configured such that the operator response window can be dictated by information that the system gains from the aircraft such as heading, altitude, and speed. By processing this information, the operator response window can be properly modified from a system default value. For example, the operator will be allowed (or have) less reaction time for an aircraft traveling at a higher speed than for one traveling at a slower speed as well as less reaction time if the heading (and/or altitude) indicates the aircraft is traveling directly into the zone versus an aircraft with a heading (and/or altitude) that may or may not catch or intersect with an outer edge of the zone scanned by a laser projector.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the control system may be used in stationary show systems such as those provided in theme parks, stadiums, and the like or in mobile show systems such as those provided on cruise ships or with mobile shows and/or special event systems. In the mobile show systems, the system may include devices, such as GPS, IMU, and the like, to dynamically adjust the coordinates of the scan range to account for movement of the one or more controlled laser projectors.

The control system designs described above will likely be much cheaper and more reliable than camera-based tracking systems, and the control system is not affected by weather as is the case with vision-based tracking systems and is useful even when an aircraft does not have its lights on. The system is often configured to log its received and created data and actions such that when terminations happened and which aircraft caused the terminations can be reviewed and analyzed. The GUI may be generated or configured so as to provide feedback to the user on the status of a current laser projector termination control (e.g., user/manual, automatic, terminated, not terminated, and the like).

The systems and methods described herein are well suited for monitoring one laser projector and/or one show. Those skilled in the art will readily understand the wider range of uses for the systems and methods such as for use in watching slices of the sky for multiple projectors in one show or in two or more shows. In such embodiments, the system would be configured to filter or streamline the information provided to each operator or laser technician to only include the information that matters to the laser or lasers that they are controlling.

The systems may be implemented to suit any particular safety protocols. In some embodiments, the systems are configured to utilized information and communications generated via the Automatic Dependent Surveillance-Broadcast (ADS-B) technology and associated requirements required for flight by for the continental United States by the Federal Aviation Administration since early 2020. The systems may be modified in operations as needed to comply with and utilize information dictated by other existing or future flight (or other) safety or flight tracking protocols, rules, or regulations, which may be implemented at a particular show location (or based on those implemented in other locations).

We claim:
1. A system for use in controlling a laser projector, comprising:

a receiver configured for receiving a tracking beacon transmitted by a transmitter in an aircraft;

a monitoring system communicatively linked to the receiver operable to communicate with the receiver to receive aircraft tracking data provided in the tracking beacon;

memory accessible by the monitoring system storing a digital model of a scan field for the laser projector;

a display in the monitoring system with a screen observable by an operator; and a processor on the monitoring system configured to execute code or instructions to provide a control module, wherein the control module generates a monitoring interface displayed on the screen, and wherein the monitoring interface includes an image of the digital model of the scan field and an icon representing the aircraft, the icon being spatially mapped to boundaries of the digital model of the scan field.

2. The system of claim 1, wherein the transmitter is configured according to the ADS-B protocol and the tracking beacon complies with the ADS-B protocol.

3. The system of claim 1, wherein the aircraft tracking data includes a current position and altitude for the aircraft and wherein the control module determines 3D coordinates for the aircraft based on the current position and altitude and spatially maps the icon relative to the image of the digital model of the scan field using the 3D coordinates.

4. The system of claim 3, wherein the aircraft tracking data further includes a heading of the aircraft and wherein the control module graphically or textually represents the heading of the aircraft proximate to or linked to the icon representing the aircraft.

5. The system of claim 1, wherein the control module processes the aircraft tracking data to determine a warning classification for the aircraft by comparing a position of the aircraft provided in the tracking beacon with the boundaries of the digital model of the scan field and wherein the monitoring interface is generated to include the warning classification.

6. The system of claim 5, wherein the warning classification is determined in part based on a current heading of the aircraft provided in the tracking beacon indicating the aircraft will intersect with the scan field or is moving away from the scan field.

7. The system of claim 6, wherein the control module generates GPS coordinates for each of the boundaries of the scan field to define the digital model and wherein the GPS coordinates are calculated based on the horizontal and vertical scan angles of the laser projector.

8. The system of claim 7, wherein the GPS coordinates of an outer boundary are calculated based on a range of the laser projector calculated by the control module.

9. The system of claim 1, wherein the GPS coordinates of at least one of the boundaries is modified based on a laser projection profile associated with an outdoor show being performed in part by the laser projector during an operating period in which the tracking beacon is received by the receiver.

10. The system of claim 1, wherein the control module automatically generates a termination signal that is communicated to the laser projector or generates a control signal to operate a mechanical shutter in front of the laser projector to close, when the control module determines the aircraft is intersecting or will intersect within a predefined amount of time with the scan field based on a comparison of the digital model of the scan field and a current position or current position, heading, and speed provided in the aircraft tracking data.

11. A system for use in controlling a laser projector, comprising:

an RF receiver configured to receive ADS-B protocol signals transmitted from an aircraft;

a monitoring system communicatively lined to the RF receiver to receive aircraft tracking data from the RF receiver based on a received one of the ADS-B protocol signals, wherein the aircraft tracking data includes a current position and heading of the aircraft;

a controller in the monitoring system generating a monitoring interface that includes an image of a scan field of the laser projector, an icon representing the aircraft spatially mapping the current position to the image of the scan field, and a textual or graphic representation of the heading of the aircraft; and a display operated by the controller to display the monitoring interface.

12. The system of claim 11, wherein the aircraft tracking data further comprises a current speed of the aircraft and wherein the monitoring interface includes a textual or graphical indicator of the current speed of the aircraft.

13. The system of claim 12, wherein the textual or graphical indicator of the current speed includes a warning of intersection of the aircraft with the scan field within a predefined time period based on the current position, the heading, and the current speed of the aircraft.

14. The system of claim 11, wherein the image of the scan field is generated based on a current orientation of an output of the laser projector and GPS coordinates of boundaries of the scan field.

15. The system of claim 11, wherein the monitoring interface includes a query to an operator requesting confirmation that the operator has detected the icon of the aircraft and, when the icon intersects the image of the scan field or the confirmation is not received within a predefined time period, the controller automatically generates a termination control signal for the laser projector.

16. The system of claim 15, wherein the predefined time period is calculated by the controller based on at least one of aircraft heading, aircraft speed, and aircraft altitude provided in the aircraft tracking data.

17. A method for use in controlling a laser projector during an outdoor show, comprising:

displaying an image representative of a scan field of the laser projector on a display screen;

receiving aircraft tracking data from a receiver;

processing the aircraft tracking data to determine 3D coordinates for an aircraft associated with the aircraft tracking data; and concurrently with the displaying of the image, displaying a symbol representative of the aircraft on the display screen at a position mapped to coordinates of one or more boundaries defining the scan field based on the 3D coordinates of the aircraft.

18. The method of claim 17, further comprising processing the aircraft traffic data to determine a warning classification for the aircraft based on the 3D coordinates of the aircraft and a current heading of the aircraft, wherein the warning classification is displayed on the display screen with the symbol representative of the aircraft and wherein the warning classification is indicative of a likelihood of an intersection of the aircraft with one of the boundaries of the scan field within a predefined time period.

19. The method of claim 18, wherein the warning classification comprises coloring of the symbol with a color that is coded to the likelihood of the intersection.

20. The method of claim 19, further comprising logging in data storage at least a portion of processed data including the aircraft traffic data, the warning classification, and any termination signal information generated or received during the displaying step.

21. The method of claim 17, wherein the receiver is an RF receiver configured for receiving an ADS-B signal from the aircraft comprising the aircraft tracking data.

22. The method of claim 17, further comprising calculating the coordinates of the one or more boundaries based on scan angles and a range of the laser projector.

* * * * *